(12) United States Patent
Iwasawa

(10) Patent No.: US 8,218,248 B2
(45) Date of Patent: Jul. 10, 2012

(54) ZOOM LENS AND IMAGING OPTICAL DEVICE INCLUDING THE SAME

(75) Inventor: Yoshito Iwasawa, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 302 days.

(21) Appl. No.: 12/723,784

(22) Filed: Mar. 15, 2010

(65) Prior Publication Data

US 2010/0253830 A1 Oct. 7, 2010

(30) Foreign Application Priority Data

Apr. 1, 2009 (KR) .......................... 10-2009-0028136

(51) Int. Cl.
*G02B 15/14* (2006.01)

(52) U.S. Cl. ...................... 359/689; 359/676

(58) Field of Classification Search .................. 359/676, 359/680–682, 689

See application file for complete search history.

(56) References Cited

U.S. PATENT DOCUMENTS

| | | | | |
|---|---|---|---|---|
| 6,985,300 B2* | 1/2006 | Sato | ............... | 359/680 |
| 7,050,242 B2* | 5/2006 | Adachi | ............... | 359/689 |
| 7,102,830 B2* | 9/2006 | Mihara | ............... | 359/689 |
| 7,142,371 B2* | 11/2006 | Mihara | ............... | 359/689 |
| 7,339,749 B2* | 3/2008 | Katakura | ............... | 359/689 |
| 2003/0210471 A1* | 11/2003 | Mihara et al. | ............... | 359/691 |
| 2008/0084616 A1* | 4/2008 | Katakura | ............... | 359/689 |

* cited by examiner

*Primary Examiner* — James Greece

(74) *Attorney, Agent, or Firm* — Drinker Biddle & Reath LLP

(57) ABSTRACT

A zoom lens and an imaging optical device having the same. The zoom lens includes: in order from an object side, a first lens group having negative refractive power; a second lens group having positive refractive power; and a third lens group having positive refractive power. A light adjusting unit is disposed between the second and third lens groups. The first lens group includes a negative lens having an aspherical surface at least on an image side, and a positive lens having large curvature on the object side. The second lens group includes a front group on the object side, and a rear group. The front group includes a positive lens having an aspherical surface at the object side, the front group having positive refractive power as a whole. The rear group includes a doublet lens including positive and negative lenses. The rear group has negative refractive power as a whole. The front and rear groups are spaced apart from each other by an air gap.

16 Claims, 17 Drawing Sheets

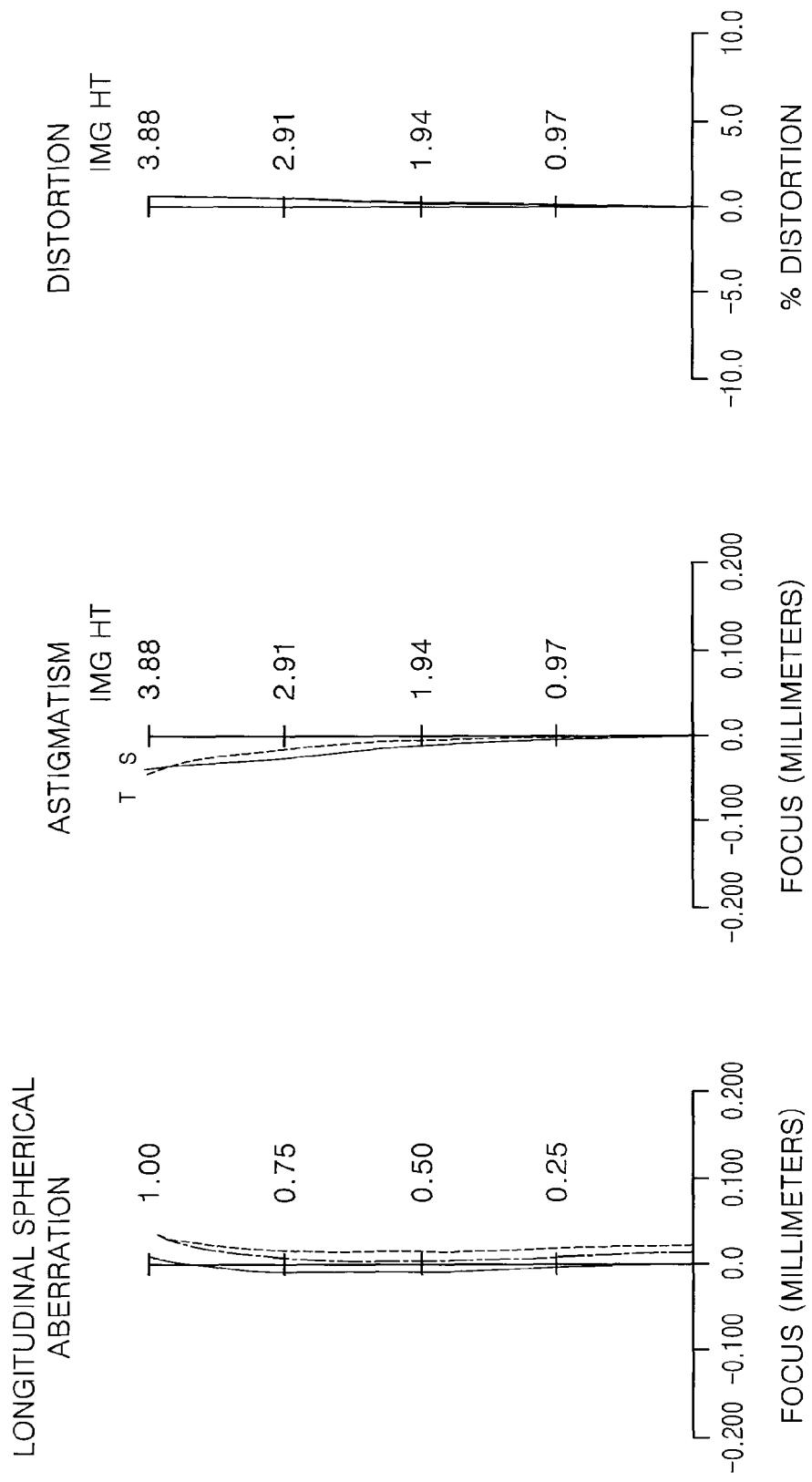

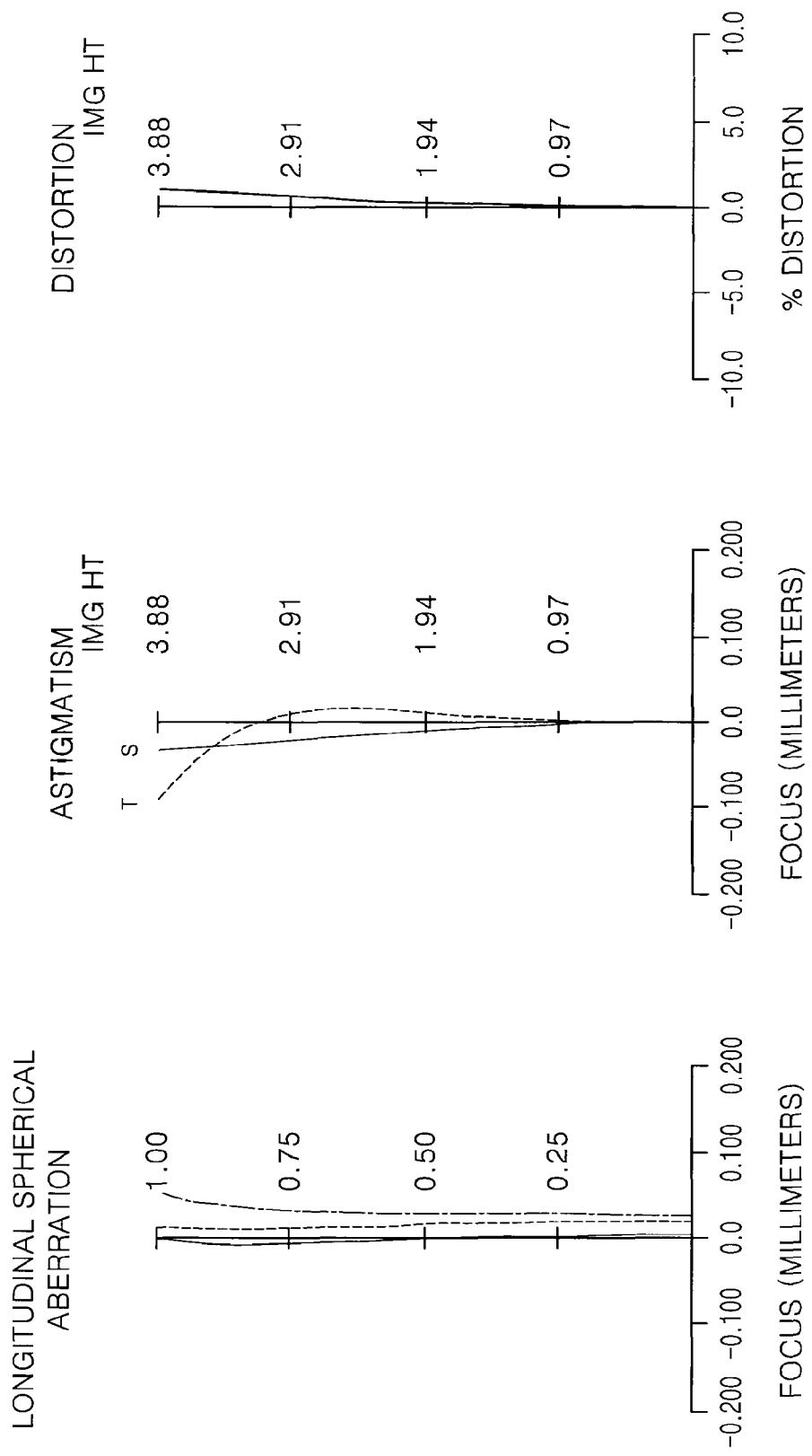

ZOOM LENS AND IMAGING OPTICAL DEVICE INCLUDING THE SAME

CROSS-REFERENCE TO RELATED PATENT APPLICATION

This application claims the benefit of Korean Patent Application No. 10-2009-0028136, filed on Apr. 1, 2009, in the Korean Intellectual Property Office, the disclosure of which is incorporated herein in its entirety by reference.

BACKGROUND OF THE INVENTION

1. Field of the Invention

The invention relates to a miniaturized wide-angle zoom lens having a high zoom magnification, and an imaging optical device including the zoom lens.

2. Description of the Related Art

Digital cameras or video cameras, including a solid-state imaging device such as a charge-coupled device (CCD) or a complementary metal-oxide semiconductor (CMOS), have become widely used. Particularly, megapixel camera modules have become widely used, and even low and middle priced digital cameras have a high resolution of 5 megapixels or more. Thus, there is a need for small, light, and inexpensive imaging optical devices, such as digital cameras or cellular phone cameras, which use imaging devices such as a CCD or CMOS. Furthermore, such imaging optical devices should have a wide angle of view to image an object in a wide range.

SUMMARY OF THE INVENTION

An embodiment of the invention provides a miniaturized wide-angle zoom lens having a high zoom magnification.

An embodiment of the invention also provides an imaging optical device including the miniaturized wide-angle zoom lens having a high zoom magnification.

According to an aspect of the invention, there is provided a zoom lens including: in order from an object side, a first lens group having negative refractive power; a second lens group having positive refractive power; and a third lens group having positive refractive power, wherein a light adjusting unit is disposed between the second lens group and the third lens group, wherein the first lens group includes: a negative lens having an aspherical surface at least on the image side; and a positive lens having large curvature on the object side, wherein the second lens group includes: a front group including a positive lens having an aspherical surface on the object side, the front group having an overall positive refractive power; and a rear group including a doublet lens including a positive lens and a negative lens, the rear group having an overall negative refractive power, the rear group being spaced apart from the front group by a predetermined air gap, and wherein the zoom lens satisfies the following Inequalities, $1.6 < |\beta 2T| < 2.7$ $3.0 < |\beta 2T / \beta 2W| < 4.6$ $0.2 < |CrG4R/fT| < 0.45$ $2.0 < |fG45/fG3| < 7.0$ $35 < vdG3 - vdG2 < 75$ [Inequalities]

where β 2T denotes magnification of the second lens group at the tele-position, and β 2W denotes magnification of the second lens group at the wide position, and fT denotes the focal length of the zoom lens at the tele-position, and CrG4R denotes the radius of curvature of the contact surface in the doublet lens, and fG45 denotes the focal length of the rear group, and fG3 denotes the focal length of the front group, and vdG3 denotes an Abbe number of the positive lens of the front group with respect to a d-line, and vdG2 denotes an Abbe number of the positive lens of the first lens group with respect to the d-line.

The second lens group may move in a perpendicular direction to the optical axis to compensate for lens-shake, and the zoom lens may satisfy the following Inequality, $2.0 < (1-\beta 2T) \times \beta 3T < 3.0$ [Inequality]

where β 3T denotes magnification of the third lens group at the tele-position.

The aspherical surface of the negative lens of the first lens group may have curvature that decreases toward the edge of the aspherical surface of the negative lens and is less than paraxial curvature of the aspherical surface.

The first, second and third lens groups may move when zooming.

The light adjusting unit may move together with the second lens group when zooming.

According to another embodiment of the invention, there is provided a zoom lens including: in order from an object side, a first lens group having negative refractive power; a second lens group having positive refractive power; and a third lens group having positive refractive power, wherein a light adjusting unit is disposed between the second lens group and the third lens group, wherein the first lens group includes: a negative lens having an aspherical surface at least on the image side; and a positive lens having large curvature on the object side, wherein the second lens group includes: in order from the object side, a positive lens having an aspherical surface on the object side; and a doublet lens including a positive lens and a negative lens, and wherein the zoom lens satisfies the following Inequalities, $2.0 < |fG45/fG3| < 7.0$ $35 < vdG3 - vdG2 < 75$ $1.8 < |\beta 2T| < 2.7$ $0.0 < TLT - TLW < 7.0$ [Inequalities]

where fG45 denotes the focal length of the doublet lens, and fG3 denotes the focal length of the positive lens on the object side of the second lens group, and vdG3 denotes an Abbe number of the positive lens on the object side of the second lens group with respect to a d-line, and vdG2 denotes an Abbe number of the positive lens of the first lens group with respect to the d-line, and vdG2 denotes an Abbe number of the positive lens of the first lens group with respect to the d-line, and β 2T denotes magnification of the second lens group at the tele-position, and TLT denotes the total length of the zoom lens at the tele-position, and TLW denotes the total length of the zoom lens at the wide position.

The second lens group may move in a perpendicular direction to the optical axis to compensate for lens-shake, and the zoom lens may satisfy the follow Inequality, $2.0 < (1-\beta 2T) \times \beta 3T < 3.0$ [Inequality]

where β 3T denotes magnification of the third lens group at the tele-position.

The aspherical surface of the negative lens of the first lens group may have curvature that decreases toward the edge of the aspherical surface of the negative lens and is less than paraxial curvature of the aspherical surface.

The first, second and third lens groups may move when zooming.

The light adjusting unit may move together with the second lens group when zooming.

According to another embodiment of the invention, there is provided an imaging optical device including: a zoom lens; and an imaging sensor that receives light collected by the zoom lens, wherein the zoom lens includes: in order from an object side, a first lens group having negative refractive power; a second lens group having positive refractive power; and a third lens group having positive refractive power, and a light adjusting unit is disposed between the second lens group and the third lens group, wherein the first lens group includes: a negative lens having an aspherical surface at least on the image side; and a positive lens having large curvature on the object side, wherein the second lens group includes: a front group including a positive lens having an aspherical surface on the object side, the front group having an overall positive refractive power; and a rear group including a doublet lens including a positive lens and a negative lens, the rear group having an overall negative refractive power, the rear group being spaced apart from the front group by a predetermined air gap, and wherein the zoom lens satisfies the following Inequalities, $1.6<|\beta 2T|<2.7$ $3.0<|\beta 2T/\beta 2W|<4.6$ $0.2<|CrG4R/fT|<0.45$ $2.0<|fG45/fG3|<7.0$ $35<vdG3-vdG2<75$ [Inequalities]

where β 2T denotes magnification of the second lens group at the tele-position, and β 2W denotes magnification of the second lens group at the wide position, and fT denotes the focal length of the zoom lens at the tele-position, and CrG4R denotes the radius of curvature of the contact surface in the doublet lens, and fG45 denotes the focal length of the rear group, and fG3 denotes the focal length of the front group, and vdG3 denotes an Abbe number of the positive lens of the front group with respect to a d-line, and vdG2 denotes an Abbe number of the positive lens of the first lens group with respect to the d-line.

The imaging optical device may further include a distortion correcting member that calculates a distortion correction amount for distortion generated at the zoom lens, so as to correct the distortion.

The distortion may have a range of Inequality, $-15<DisW<-6$ [Inequality]

where DisW denotes distortion at the maximum image height at the wide position.

According to another embodiment of the invention, there is provided an imaging optical device including: a zoom lens; and an imaging sensor that receives light collected by the zoom lens, wherein the zoom lens includes: in order from the object side, a first lens group having negative refractive power; a second lens group having positive refractive power; and a third lens group having positive refractive power, and a light adjusting unit is disposed between the second lens group and the third lens group, wherein the first lens group includes: a negative lens having an aspherical surface at least on the image side; and a positive lens having large curvature on the object side, wherein the second lens group includes: in order from the object side, a positive lens having an aspherical surface on the object side; and a doublet lens including a positive lens and a negative lens, and wherein the zoom lens satisfies the following Inequalities, $2.0<|fG45/fG3|<7.0$ $35<vdG3-vdG2<75$ $1.8<|\beta 2T|<2.7$ $0.0<TLT-TLW<7.0$ [Inequalities]

where fG45 denotes the focal length of the doublet lens, and fG3 denotes the focal length of the positive lens on the object side of the second lens group, and vdG3 denotes an Abbe number of the positive lens on the object side of the second lens group with respect to a d-line, and vdG2 denotes an Abbe number of the positive lens of the first lens group with respect to the d-line, and β 2T denotes the magnification of the second lens group at the tele-position, and TLT denotes the total length of the zoom lens at the tele-position, and TLW denotes the total length of the zoom lens at the wide position.

The imaging optical device may further include a distortion correcting member that calculates a distortion correction amount for distortion generated at the zoom lens, so as to correct the distortion.

The distortion may have a range of Inequality, $-15<DisW<-6$ [Inequality]

where DisW denotes distortion at the maximum image height at the wide position.

BRIEF DESCRIPTION OF THE DRAWINGS

The above and other features and advantages of embodiments of the invention will become more apparent by the following details description and with reference to the attached drawings in which:

FIGS. 2A, 2B and 2C are graphs illustrating aberrations of the zoom lens of FIG. 1 at the wide position, the middle position, and the tele-position;

FIGS. 6A, 6B and 6C are graphs illustrating aberrations of the zoom lens of FIG. 5 at the wide position, the middle position, and the tele-position;

DETAILED DESCRIPTION OF THE INVENTION

Embodiments of the invention will now be described more fully with reference to the accompanying drawings, in which exemplary embodiments of the invention are shown.

Figure 1:
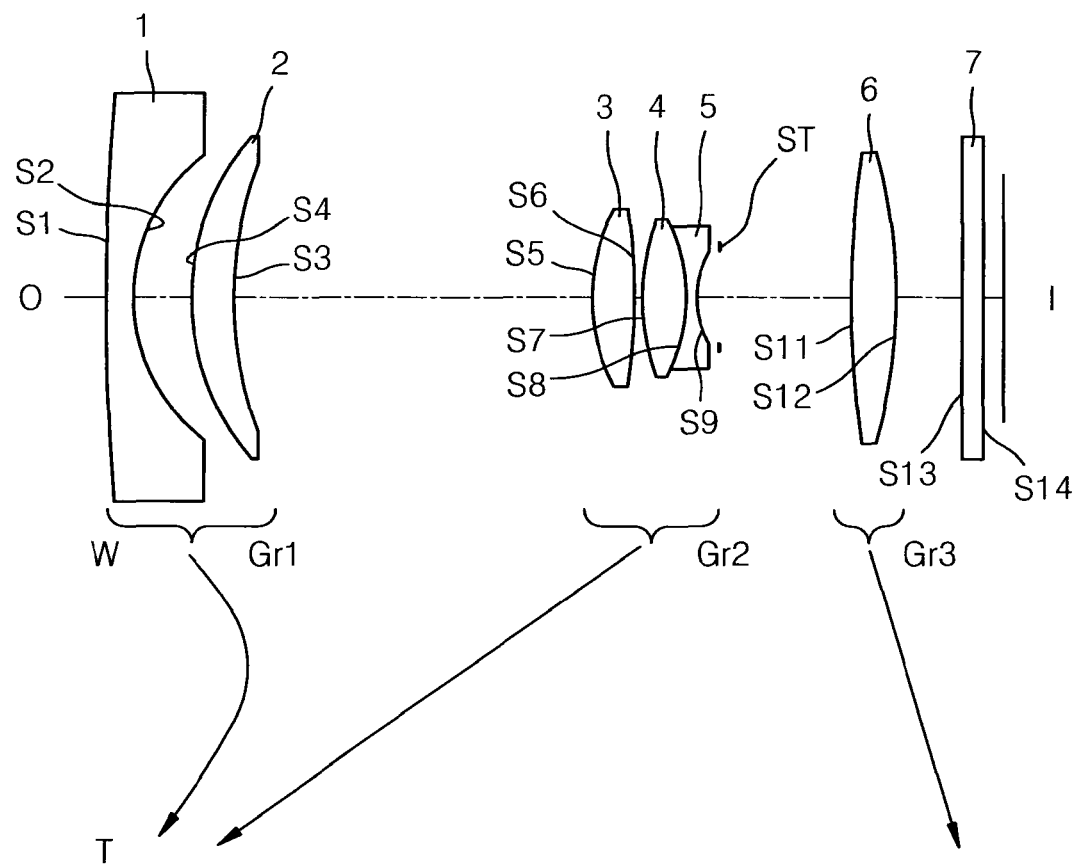
FIG. 1 is a schematic view illustrating a zoom lens at the wide position, the middle position, and the tele-position, according to an embodiment of the invention.

FIG. 1 is a schematic view illustrating a zoom lens at the wide position W, the middle position, and the tele-position T, according to an embodiment of the invention.

Referring to FIG. 1, the zoom lens according to an embodiment of the invention includes, in order from the object side O to the image side I, a first lens group Gr1 having negative refractive power, a second lens group Gr2 having positive refractive power, and a third lens group Gr3 having positive refractive power.

A light adjusting unit ST is disposed between the second lens group Gr2 and the third lens group Gr3. For example, the light adjusting unit ST may be one of a shutter, a neutral density (ND) filter, and a stop. The light adjusting unit ST may decrease the distance between the first lens group Gr1 and the second lens group Gr2 at the tele-position T and thus facilitating to correct spherical aberration, axial chromatic aberration, and coma aberration at the tele-position T, and to reduce the size of the zoom lens when retracting the zoom lens.

The first lens group Gr1 may include a negative lens 1 having an aspherical surface at least on the image side I, and a positive lens 2 having large curvature on the object side O. For example, the first lens group Gr1 may include a negative lens having aspherical surfaces on both its sides, and a positive lens having a convex surface with large curvature on the object side O. In this case, one of the aspherical surfaces of the negative lens is concave with large curvature on the image side I. The curvature of the positive lens 2 on the object side O may be larger than on the image side I. The negative lens 1 has an aspherical surface on the image side I to easily correct field curvature and distortion at the wide position W. The curvature of the aspherical surfaces may decrease toward its edge and be less than its paraxial curvature.

The second lens group Gr2 may include a front group and a rear group. The front group has an aspherical surface on the object side O and positive refractive power. For example, the front group may include a positive lens 3, and the rear group may include a doublet lens of a positive lens 4 and a negative lens 5. The positive lens 3 may have aspherical surfaces on both its sides. The doublet lens may have an overall negative refractive power. The front and rear groups of the second lens group Gr2 may be spaced apart from each other by an air gap. The aspherical surface of the positive lens 3 corrects the spherical aberration at the tele-position T. The third lens group Gr3 may include a positive lens 6 that has an aspherical surface on the image side I.

When the zoom lens according to the present embodiment moves from the wide position W to the tele-position T, all of the first lens group Gr1, the second lens group Gr2 and the third lens group Gr3 move. The light adjusting unit ST is disposed on the image side I of the second lens group Gr2 to move together with the second lens group Gr2 when zooming. An infrared (IR) cut-off filter 7 may be disposed between the third lens group Gr3 and the image side I.

The zoom lens according to the present embodiment may be configured to satisfy Inequalities 1 and 2.

$$1.6 < |\beta 2T| < 2.7 \quad \text{[Inequality 1]}$$

$$3.0 < |\beta 2T/\beta 2W| < 4.6 \quad \text{[Inequality 2]}$$

where $\beta 2T$ denotes the magnification of the second lens group Gr2 at the tele-position T, and $\beta 2W$ denotes the magnification of the second lens group Gr2 at the wide position W.

Inequalities 1 and 2 limit the magnification of the second lens group Gr2. When $|\beta 2T|$ and $|\beta 2T/\beta 2W|$ of the second lens group Gr2 are less than the lower limits of Inequalities 1 and 2, that is, when the magnification of the second lens group Gr2 is decreased, it is difficult to increase the magnification of the zoom lens. When $|\beta 2T|$ and $|\beta 2T/\beta 2W|$ of the second lens group Gr2 are greater than the upper limits of Inequalities 1 and 2, that is, when the magnification of the second lens group Gr2 is increased, it is difficult to correct the aberration thereof.

To increase the zoom magnification of the zoom lens according to the present embodiment, the magnification of the second lens group Gr2 at the tele-position T is increased. This increases the magnification variation of the second lens group Gr2 and thus the zoom lens can have high magnification. To improve the performance of the zoom lens, the aberration of the second lens group Gr2 needs to also be corrected, as well as increasing the magnification variation of the second lens group Gr2. Furthermore, it is necessary to minimize the number of lenses to miniaturize the zoom lens. To obtain a high imaging performance with a small number of lenses, it is necessary to balance the aberrations of the respective lenses. To this end, the zoom lens according to the present embodiment may be configured to satisfy Inequalities 3 through 6.

$$0.2 < |CrG4R/fT| < 0.45 \quad \text{[Inequality 3]}$$

where fT denotes the focal length of the zoom lens at the tele-position T, and CrG4R denotes the radius of curvature of the contact surface of the doublet lens. Inequality 3 limits the radius of curvature of the contact surface of the doublet lens. When CrG4R/fT is lower than the lower limit of Inequality 3, that is, when the radius of curvature of the contact surface of the doublet lens is decreased, the amount of aberration due to a manufacturing error is increased. Thus, high precision is required to manufacture the doublet lens. When CrG4R/fT is greater than the upper limit of Inequality 3, that is, when the radius of curvature of the contact surface of the doublet lens is increased, it is difficult to correct the spherical aberration or the coma aberration at the tele-position T.

$$2.0 < |fG45/fG3| < 7.0 \quad \text{[Inequality 4]}$$

where fG45 denotes the focal length of the doublet lens, and fG3 denotes the focal length of the positive lens 3. Inequality 4 limits the focal length ratio of the doublet lens to the positive lens 3. When fG45/fG3 is less than the lower limit of Inequality 4, that is, when the focal length of the doublet lens is decreased, the spherical aberration and the field curvature of the doublet lens are increased at the tele-position T. In addition, since the eccentricity sensitivity of the doublet lens is increased, high precision is required to assemble the doublet lens. When fG45/fG3 is greater than the upper limit of Inequality 4, that is, when the focal length of the doublet lens is increased, it is difficult to correct the aberration thereof.

$$35 < vdG3 - vdG2 < 75 \quad \text{[Inequality 5]}$$

where vdG3 denotes an Abbe number of the positive lens 3 with respect to a d-line, and vdG2 denotes an Abbe number of the positive lens 2 with respect to the d-line. Inequality 5 limits chromatic aberration. Correcting axial chromatic aberration at the tele-position T is balanced with correcting lateral chromatic aberration at the wide position W, within the limits of Inequality 5.

$$0.0 < TLT - TLW < 7.0 \quad \text{[Inequality 6]}$$

where TLT denotes the total length of the zoom lens at the tele-position T, and where TLW denotes the total length of the zoom lens at the wide position W. Inequality 6 limits the total length of the zoom lens at the tele-position T, and the total length of the zoom lens at the wide position W. When TLT−TLW is less than the lower limit of Inequality 6, that is, when the total length of the zoom lens at the wide position W is longer than the total length of the zoom lens at the tele-position T, the aperture of the first lens group Gr1 is increased and miniaturization of the zoom lens is difficult. When TLT−TLW is greater than the upper limit of Inequality 6, that is, when the total length of the zoom lens at the tele-position T is longer than the total length of the zoom lens at the wide position W, movement amounts of the first, second and third lens groups Gr1, Gr2, and Gr3 are increased, and thus the miniaturization of the zoom lens is difficult when telescoping the zoom lens.

The second lens group Gr2 moves in a perpendicular direction to the optical axis to compensate for lens-shake. In this case, the zoom lens satisfies Inequality 7.

$$2.0 < (1-\beta 2T) \times \beta 3T < 3.0 \qquad \text{[Inequality 7]}$$

where β 3T denotes the magnification of the third lens group Gr3 at the tele-position T. Inequality 7 limits, at the tele-position T, the ratio of the movement amount of an image in the perpendicular direction to the optical axis to the movement amount of the second lens group Gr2 in the perpendicular direction to the optical axis. That is, Inequality 7 limits the movement amount ratio of an image to the second lens group Gr2 when the second lens group Gr2 compensates for a non-stabilized image due to lens-shake during forming of the image. When $(1-\beta 2T) \times \beta 3T$ is less than the lower limit of Inequality 7, the movement amount of the second lens group Gr2 is increased to move an image a predetermined distance. This increases the size of a driving system that moves the second lens group Gr2, and thus miniaturization of the zoom lens is difficult. When $(1-\beta 2T) \times \beta 3T$ is greater than the upper limit of Inequality 7, the movement amount of an image is large even when the movement amount of the second lens group Gr2 is small, thus, making it difficult to control the image.

Figure 9A:
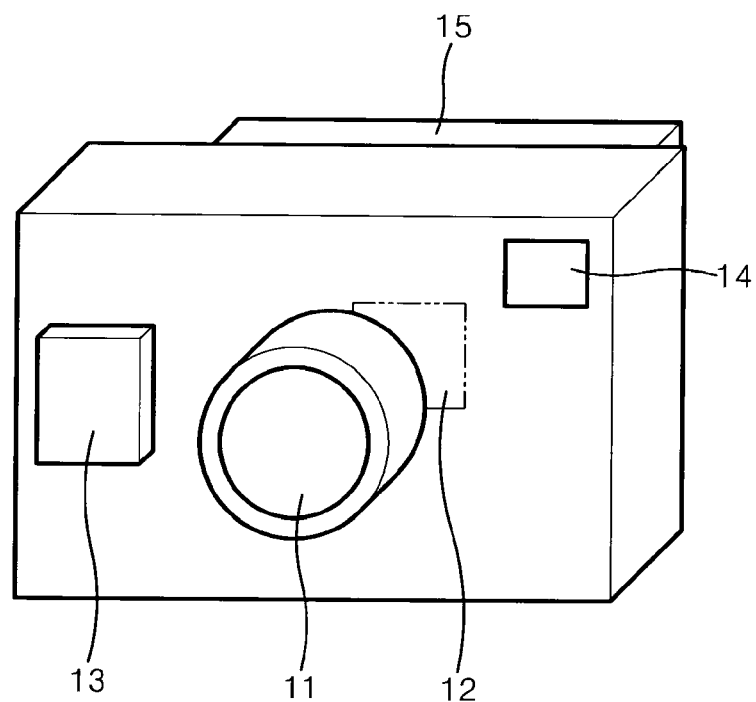
FIG. 9A is a schematic view illustrating an imaging optical device including a zoom lens, according to an embodiment of the invention.

FIG. 9A is a schematic view illustrating an imaging optical device including a zoom lens 11, according to an embodiment of the invention. The imaging optical device includes the zoom lens 11 that is the same as the previous embodiment, and an imaging sensor 12 that receives light collected by the zoom lens 11. The imaging optical device includes a storage member 13 and a finder 14 adapted for viewing an object. The storage member 13 stores data that corresponds to the object and that is photoelectric-converted by the imaging sensor 12. The imaging optical device may further include a liquid crystal display panel 15 that displays the object. The invention is not limited to the imaging optical device as illustrated in FIG. 9A, and thus, various optical devices may be exemplified. As described above, the zoom lens according to the invention is applied to the imaging optical device such as a digital camera to realize a miniaturized optical device that images an object with a high zoom magnification and wide angle of view.

Figure 9B:
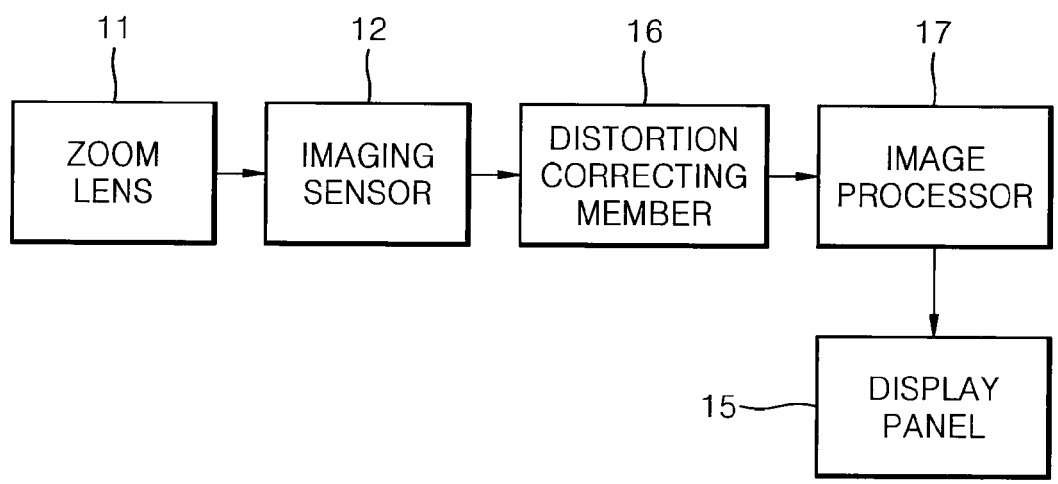
FIG. 9B is a block diagram of an imaging optical device including a zoom lens, according to an embodiment of the invention.

As the zoom lens 11 is miniaturized, distortion occurs at the wide position. FIG. 9B is a block diagram of the imaging optical device including the zoom lens 11 of FIG. 9A. Referring to FIG. 9B, the imaging optical device according to this embodiment of the invention includes a distortion correcting member 16 correcting this distortion. The distortion correcting member 16 calculates a correction amount of distortion of an image according to the amount of the distortion at the wide position, and then the image is processed at an image processing unit 17, so as to correct the distortion of the image. As a result, the image with its distortion corrected is displayed on the liquid crystal display panel 15.

The distortion may be in a range of Inequality 8.

$$-15 < DisW < -6 \qquad \text{[Inequality 8]}$$

where DisW denotes distortion at the maximum image height at the wide position W.

When the distortion is increased, the refractive power of the first lens group Gr1 may be increased. In this case, an entrance pupil may be disposed in front of the zoom lens of FIG. 1 to decrease the aperture of the first lens group Gr1. However, in the case of large distortion, the distortion occurs in the edge of an image to deteriorate the image. Thus, a correction amount of the distortion is calculated according to image data and the amount of distortion, and the correction amount is reflected to the image data to be processed. Thus, miniaturization of the zoom lens and the correcting of distortion are simultaneously achieved. Inequality 8 limits the distortion at the wide position W. When DisW is less than the lower limit of Inequality 8, that is, when the distortion is increased, correcting rate of the distortion is increased, and thus the magnification of an image is increased. In this case, the resolution of the image is deteriorated. When DisW is greater than the upper limit of Inequality 8, that is, when the distortion is decreased, the refractive power of the first lens group Gr1 is not increased, which increases the aperture the first lens group Gr1 and the total length of the zoom lens at the wide position W, thus, making it difficult to miniaturize the zoom lens.

The aspherical surfaces according to the embodiments of the invention are expressed as Equation 1.

$$Z = \frac{Ch^2}{1+\sqrt{1+\varepsilon C^2 h^2}} + A_4 y^4 + A_6 y^6 + A_8 y^8 + A_{10} y^{10} \qquad \text{[Equation 1]}$$

where h denotes the height in the perpendicular direction from the optical axis, and Z denotes a sag value along the optical axis at the height h, and C denotes paraxial curvature, and ε denotes a conic constant, and $A_i$ denotes an i-th order aspherical coefficient.

Hereinafter, various embodiments of the invention will now be described.

A line on the rightmost side in each of the figures denotes the position of the image surface IM, and the IR cut-off filter 7 or a cover glass of an imaging device may be disposed on the object side O of the image surface IM. Hereinafter, data of zoom lenses according to the embodiments, i.e., lens data, aspherical data, focal length f, F-numbers Fno, a half angles of view ω, variable distances D4, D10, and D12 between lenses, radii R of curvatures, distances between the lenses or thicknesses D, refractive indexes Nd, Abbe numbers vd with respect to the d-line (at a wavelength of 587.6 nm) will be provided. ST denotes the light adjusting unit.

One Embodiment

Figure 2A:
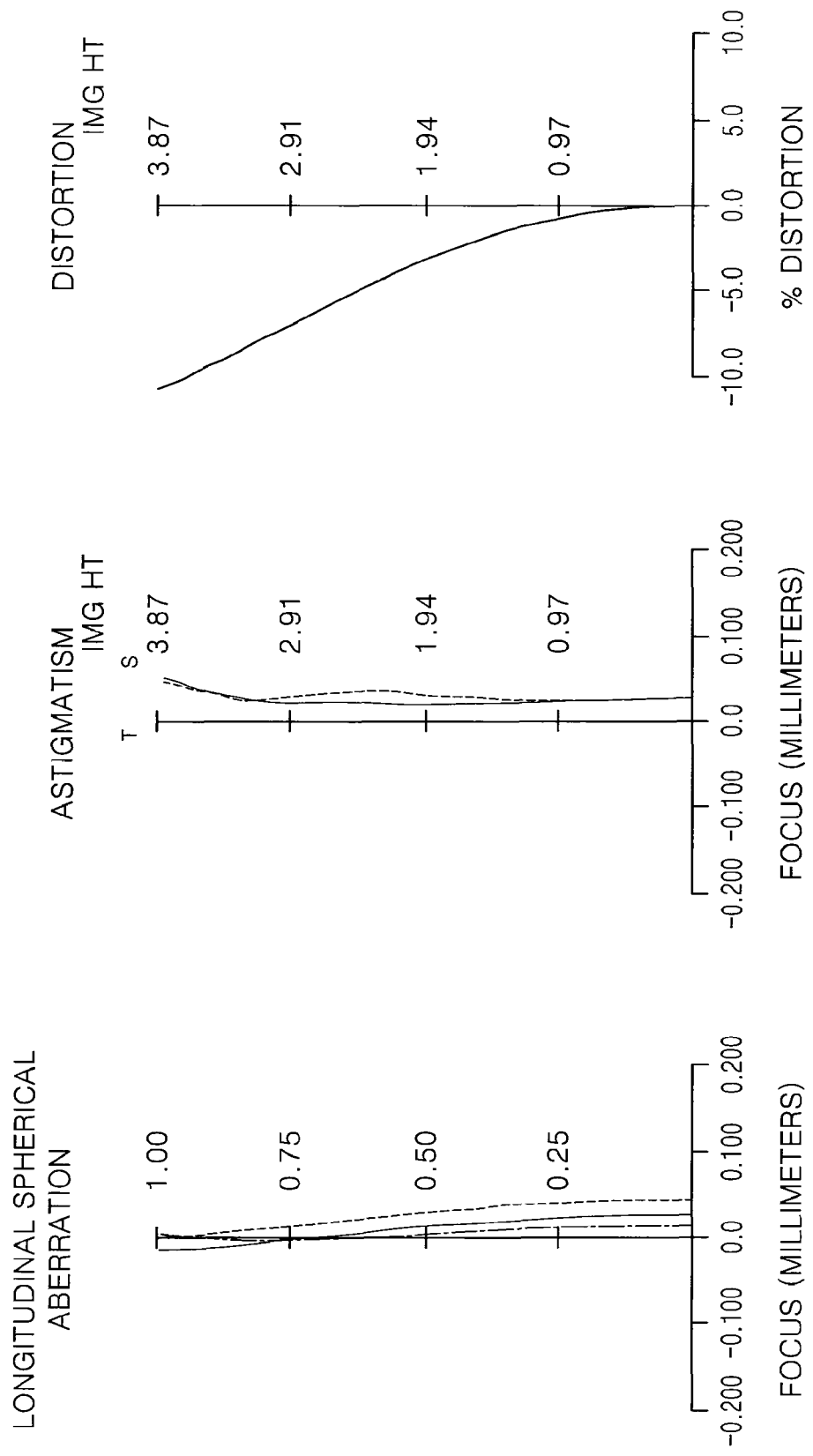
Figure 2C:
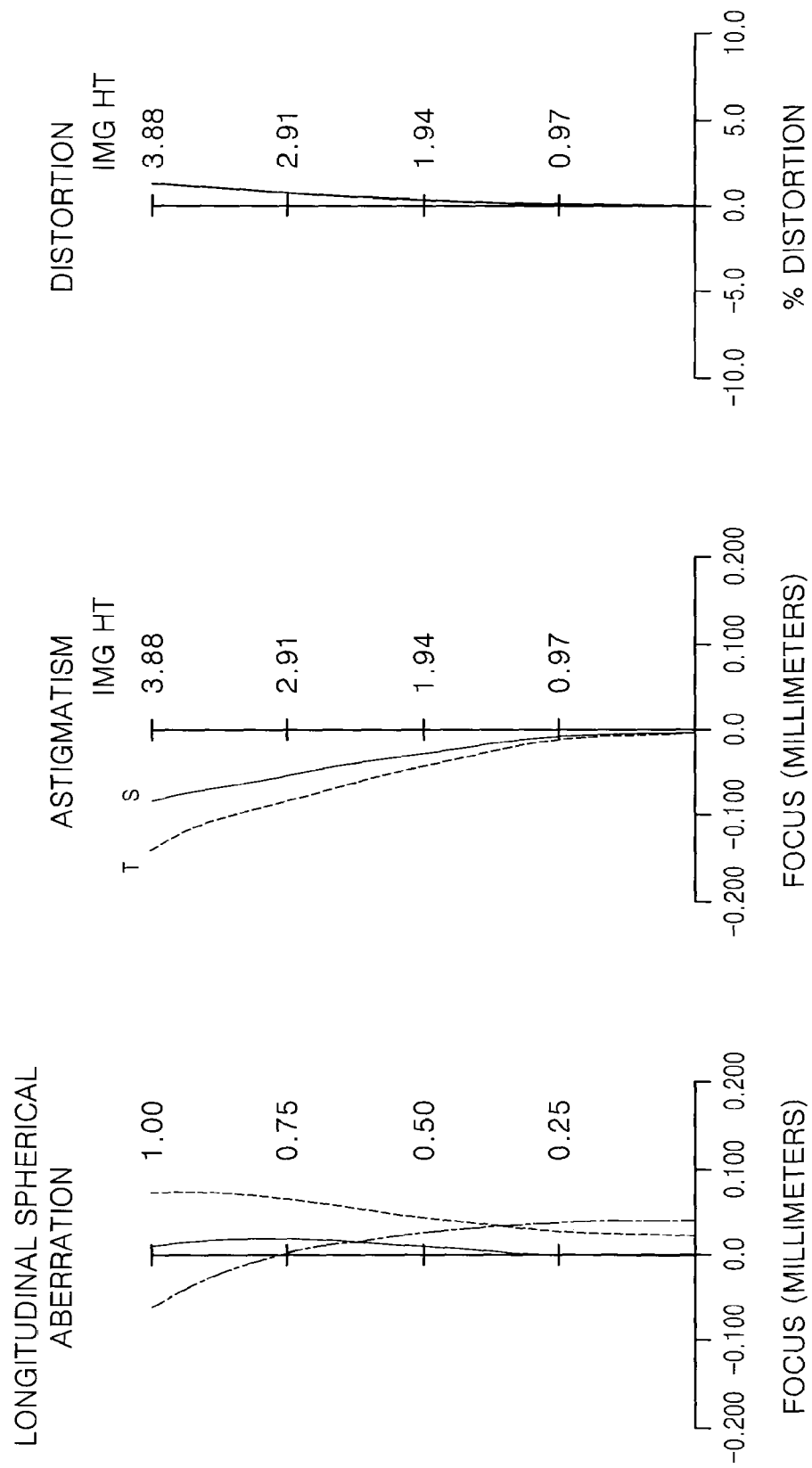

FIG. 1 is a schematic view illustrating the zoom lens, according to an embodiment of the invention. FIGS. 2A, 2B and 2C are graphs illustrating aberrations of the zoom lens of FIG. 1 at the wide position W, the middle position, and the tele-position T.

| | | |
|---|---|---|
| Fno | 2.54~4.13~6.20 | |
| F | 5.15~11.33~19.47 | |
| ω | 40.20~18.76~11.12 | |
| D4 | 12.909~4.057~0.905 | |
| D10 | 4.716~11.588~19.732 | |
| D12 | 2.362~1.869~1.350 | |

| LENS SURFACE | R | D | Nd | vd |
|---|---|---|---|---|
| S1* | 89.969 | 1.000 | 1.80470 | 40.90 |
| S2* | 5.740 | 2.120 | | |
| S3 | 8.727 | 1.500 | 1.94595 | 17.98 |
| S4 | 13.609 | D4 | | |
| S5* | 5.968 | 1.491 | 1.58913 | 61.25 |
| S6* | −24.543 | 0.317 | | |
| S7 | 8.168 | 1.540 | 1.88300 | 40.81 |
| S8 | −6.318 | 0.410 | 1.69895 | 30.05 |
| S9 | 3.420 | 0.846 | | |
| S10(ST) | INF | D10 | | |
| S11 | 34.965 | 1.600 | 1.77377 | 47.17 |
| S12* | −16.683 | D12 | | |
| S13 | INF | 0.800 | 1.15168 | 64.20 |
| S14 | INF | 0.700 | | |

| LENS SURFACE | ε | A4 | A6 | A8 | A10 |
|---|---|---|---|---|---|
| S1 | 1.0000 | −0.187830E−03 | 0.862860E−05 | −0.130672E−06 | 0.755737E−09 |
| S2 | 0.1337 | 0.611570E−04 | 0.109422E−04 | 0.146163E−06 | −0.154219E−08 |
| S5 | −0.6021 | −0.573907E−04 | −0.401781E−04 | 0.353686E−05 | −0.292845E−06 |
| S6 | 1.0000 | 0.247100E−03 | −0.264053E−04 | 0.445908E−05 | −0.324964E−06 |
| S12 | 1.0000 | 0.238895E−03 | −0.649482E−05 | 0.294399E−06 | −0.611437E−08 |

*aspherical surface.

Particularly, FIGS. 2A, 2B and 2C are graphs illustrating spherical aberration, field curvature and distortion of the zoom lens of FIG. 1 respectively at the wide position W, the middle position, and the tele-position T. In each of the graphs illustrating the spherical aberration, a solid line, a dash line, and a dot-dash line denote the spherical aberration with respect to a d-line, a C-line, a g-line, respectively. In each of the graphs illustrating the field curvature, a vertical axis, a horizontal axis, a dash line, and a solid line denote image heights, focus, and tangential field curvature T, and sagittal field curvature S, respectively.

Another Embodiment

Figure 3:
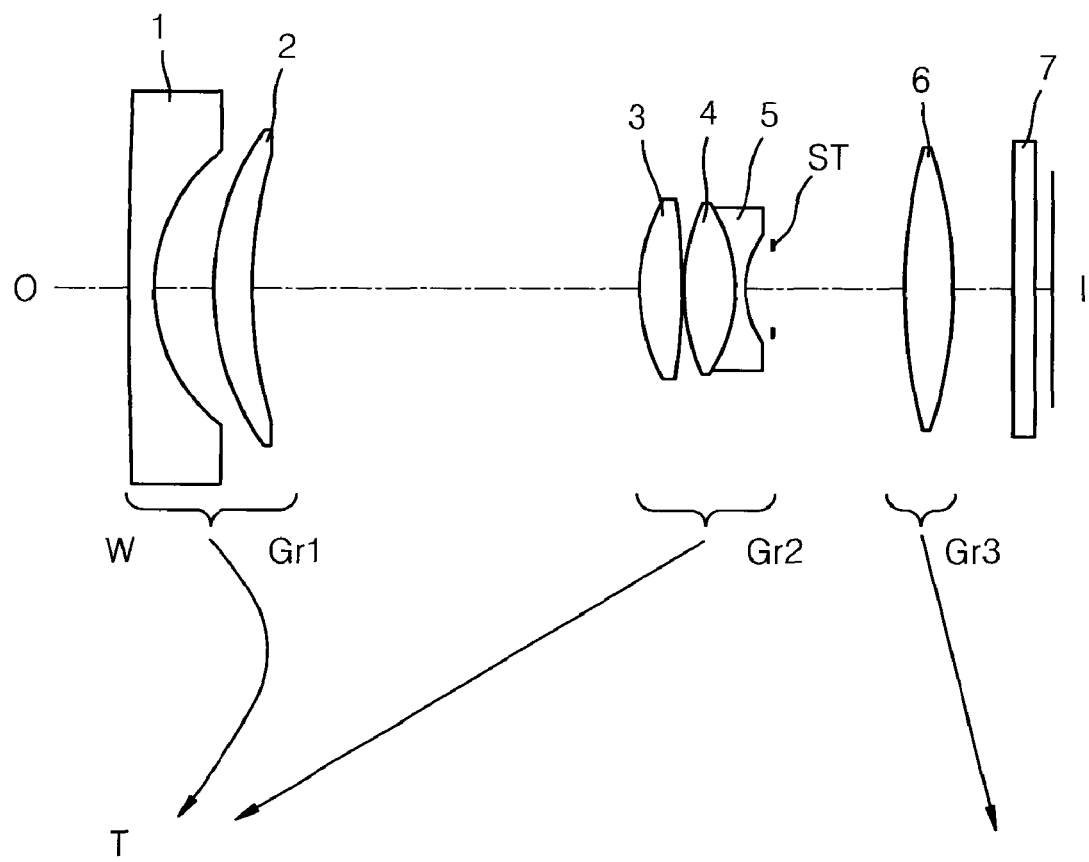
FIG. 3 is a schematic view illustrating a zoom lens at the wide position, the middle position, and the tele-position, according to another embodiment of the invention.
Figure 4A:
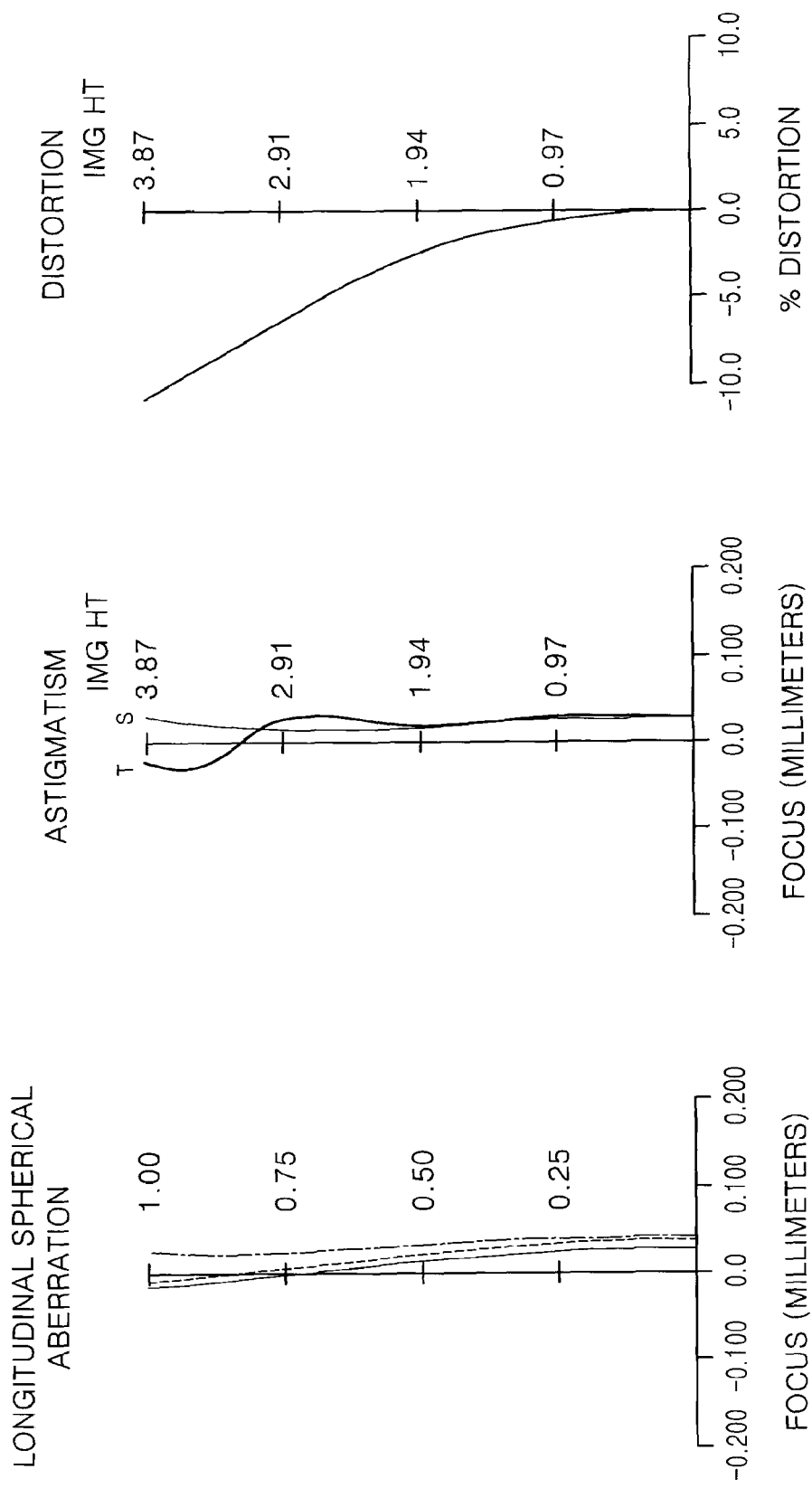
FIGS. 4A, 4B and 4C are graphs illustrating aberrations of the zoom lens of FIG. 3 at the wide position, the middle position, and the tele-position.
Figure 4B:
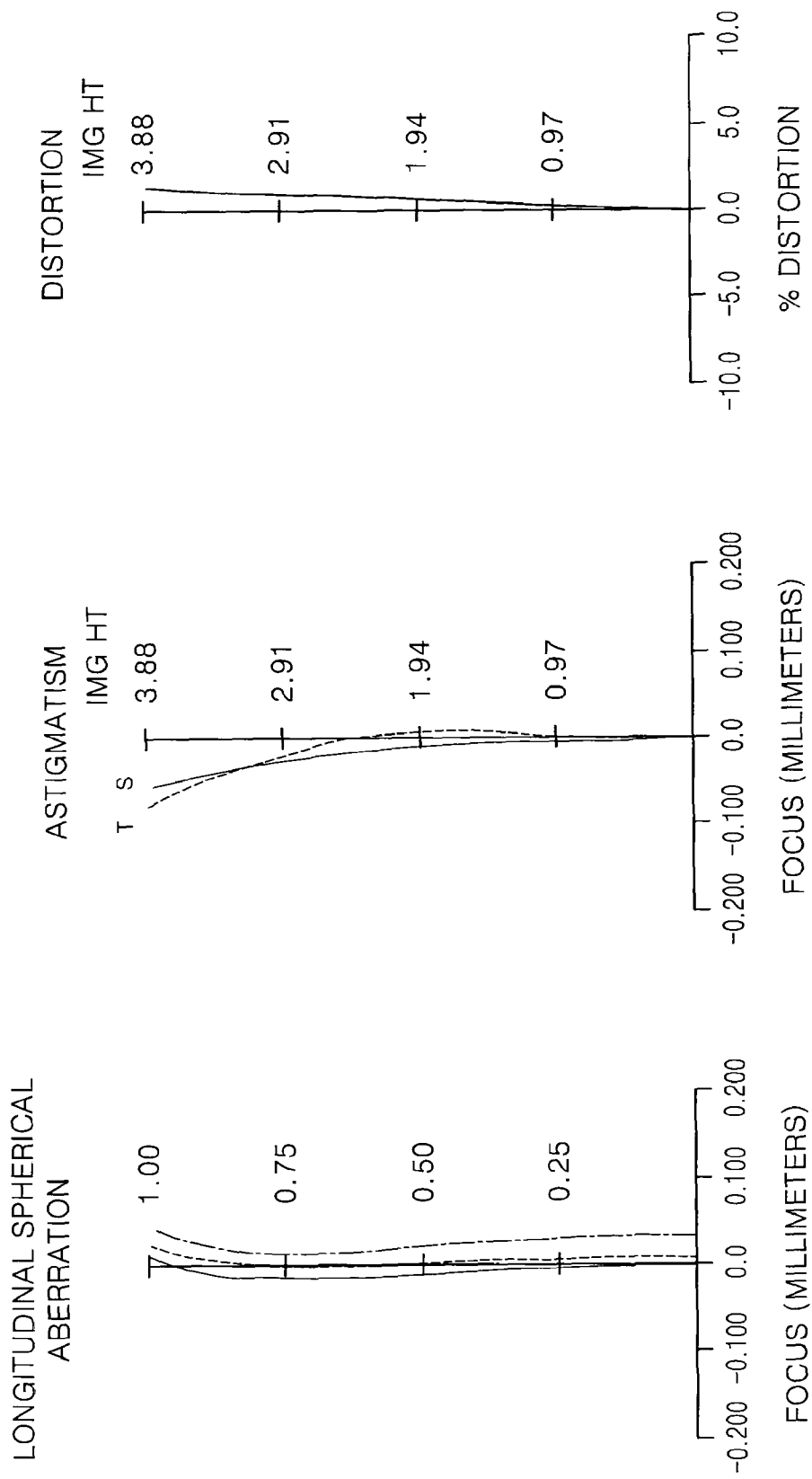
Figure 4C:
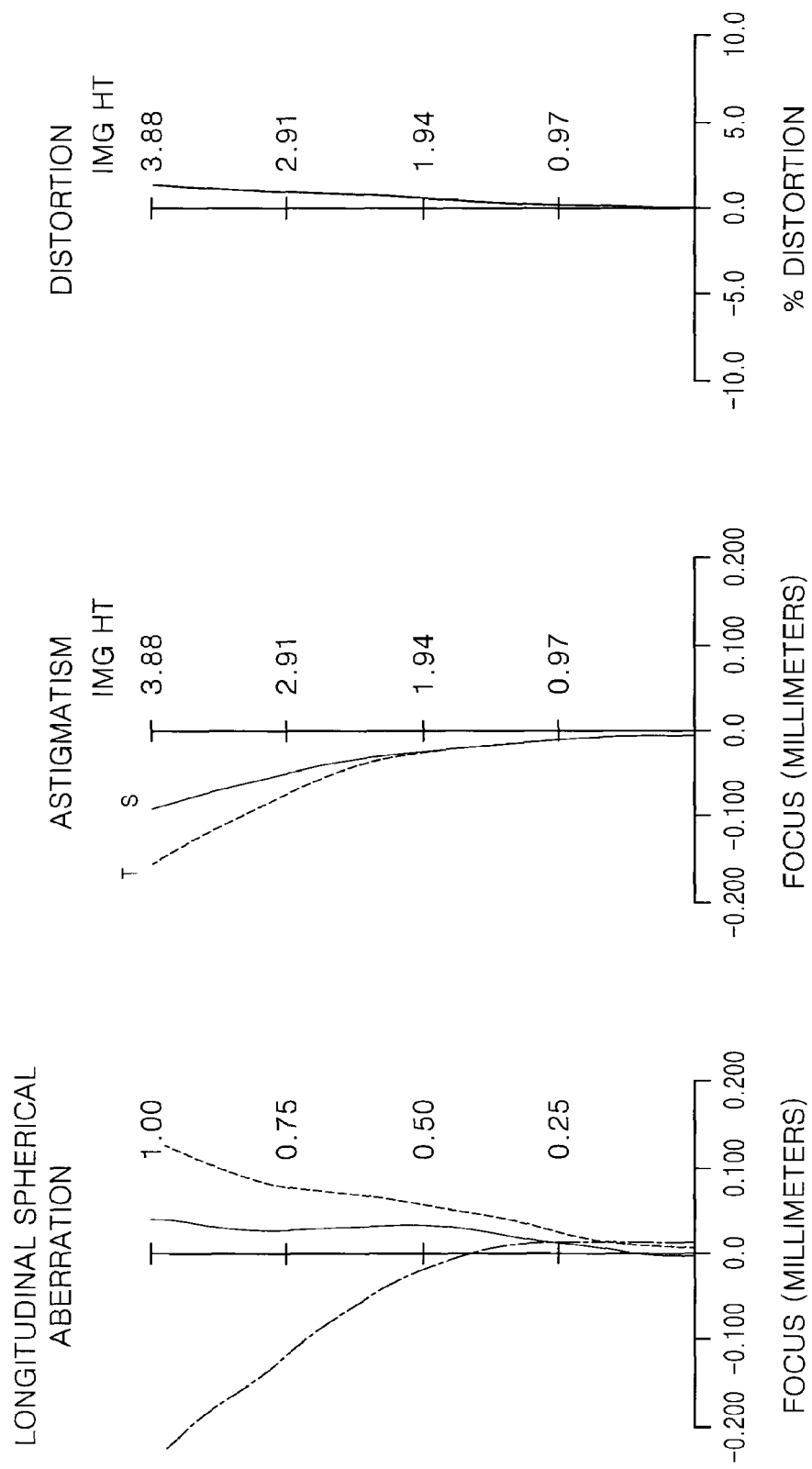

FIG. 3 is a schematic view illustrating a zoom lens according to another embodiment of the invention, and its data is as follows.

| | | |
|---|---|---|
| Fno | 2.88~5.08~6.07 | |
| f | 5.15~14.57~24.26 | |
| ω | 40.21~14.72~8.96 | |
| D4 | 15.144~3.206~0.636 | |
| D10 | 5.167~16.051~26.344 | |
| D12 | 2.350~1.910~1.330 | |

| LENS SURFACE | R | D | Nd | vd |
|---|---|---|---|---|
| S1* | 125.792 | 1.000 | 1.80470 | 40.90 |
| S2* | 5.697 | 2.320 | | |
| S3 | 10.104 | 1.528 | 1.94595 | 17.98 |
| S4 | 18.412 | D4 | | |
| S5* | 6.131 | 1.650 | 1.49710 | 81.56 |
| S6* | −21.116 | 0.119 | | |
| S7 | 8.092 | 1.969 | 1.83481 | 42.72 |
| S8 | −5.976 | 0.400 | 1.67270 | 32.17 |
| S9 | 3.617 | 1.080 | | |
| S10 | INF | D10 | | |
| S11* | 18.762 | 1.845 | 1.58313 | 59.46 |
| S12* | −17.649 | D12 | | |
| S13 | INF | 0.800 | 1.15168 | 64.20 |
| S14 | INF | 0.700 | | |

| LENS SURFACE | ε | A4 | A6 | A8 | A10 |
|---|---|---|---|---|---|
| S1 | 1.0000 | −0.219313E−03 | 0.784036E−05 | −0.103370E−06 | 0.461724E−09 |
| S2 | 0.2071 | −0.124201E−03 | 0.404837E−05 | 0.369912E−06 | −0.782449E−08 |

-continued

| | | | | | |
|---|---|---|---|---|---|
| S5 | −0.6504 | −0.503618E−05 | −0.138917E−04 | −0.125620E−05 | 0.141548E−06 |
| S6 | 1.0000 | 0.302132E−03 | −0.413807E−06 | −0.534812E−06 | 0.166857E−06 |
| S11 | 1.0000 | 0.370888E−03 | −0.515475E−04 | 0.250056E−05 | −0.464811E−07 |
| S12 | 1.0000 | 0.918641E−03 | −0.943428E−04 | 0.438505E−05 | −0.772964E−07 |

*aspherical surface

Another Embodiment

Figure 5:
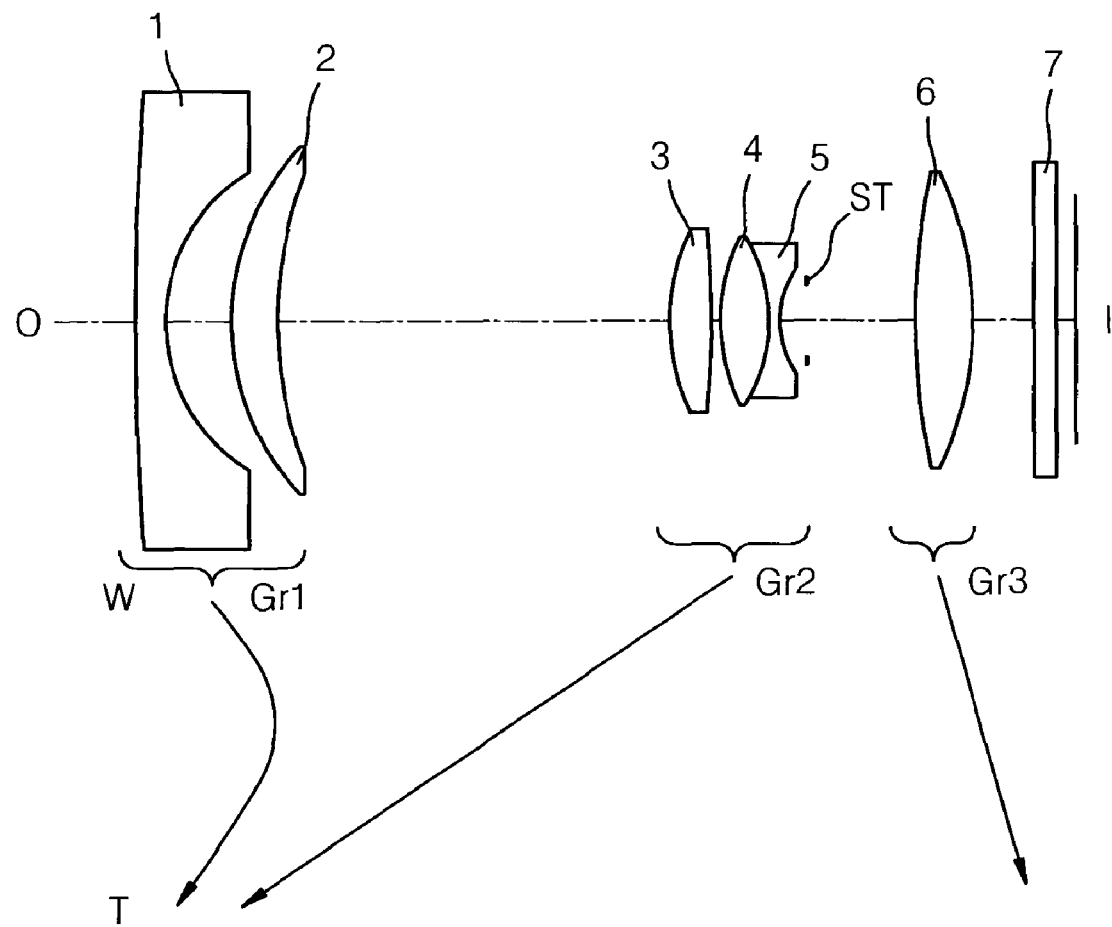
FIG. 5 is a schematic view illustrating a zoom lens at the wide position, the middle position, and the tele-position, according to another embodiment of the invention.
Figure 6A:
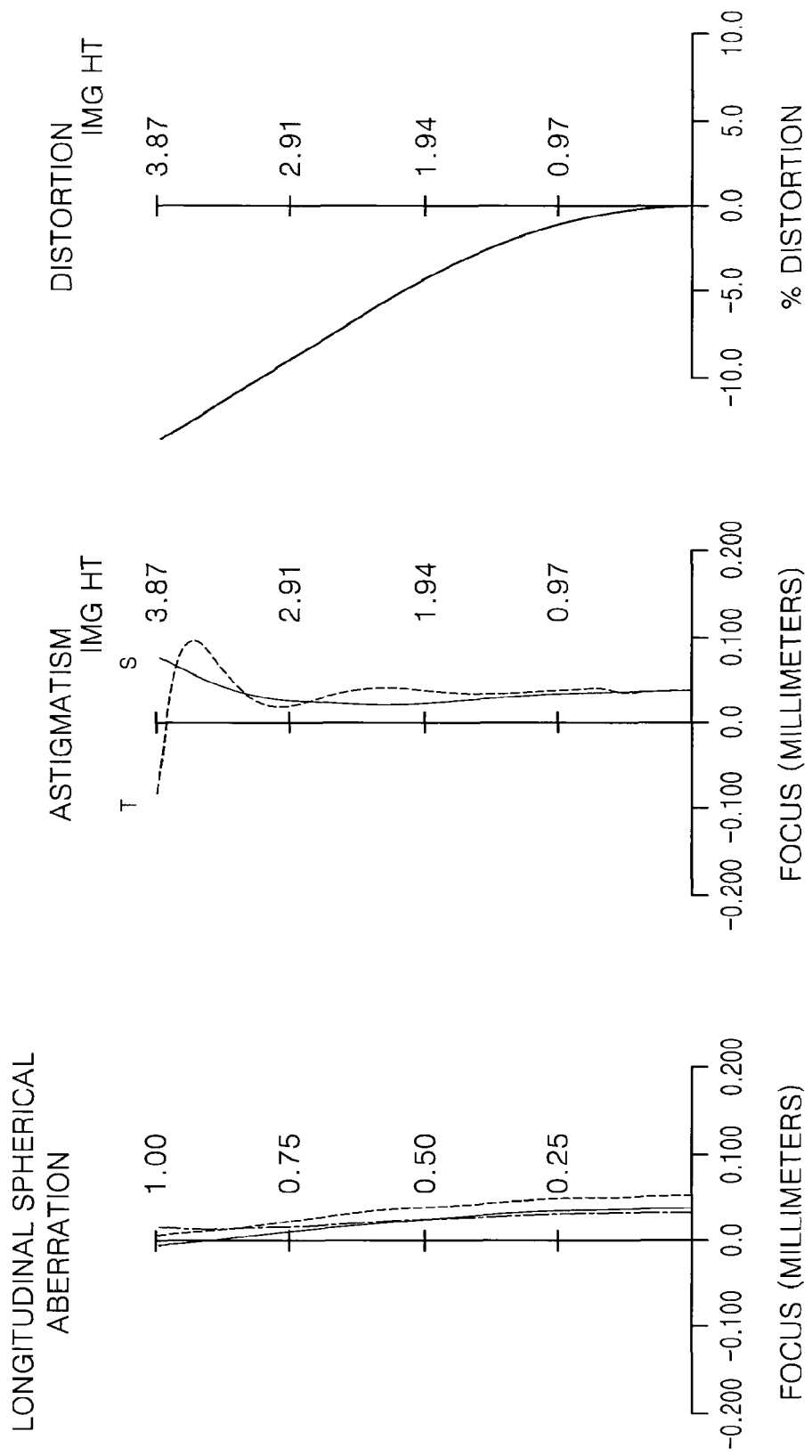
Figure 6C:
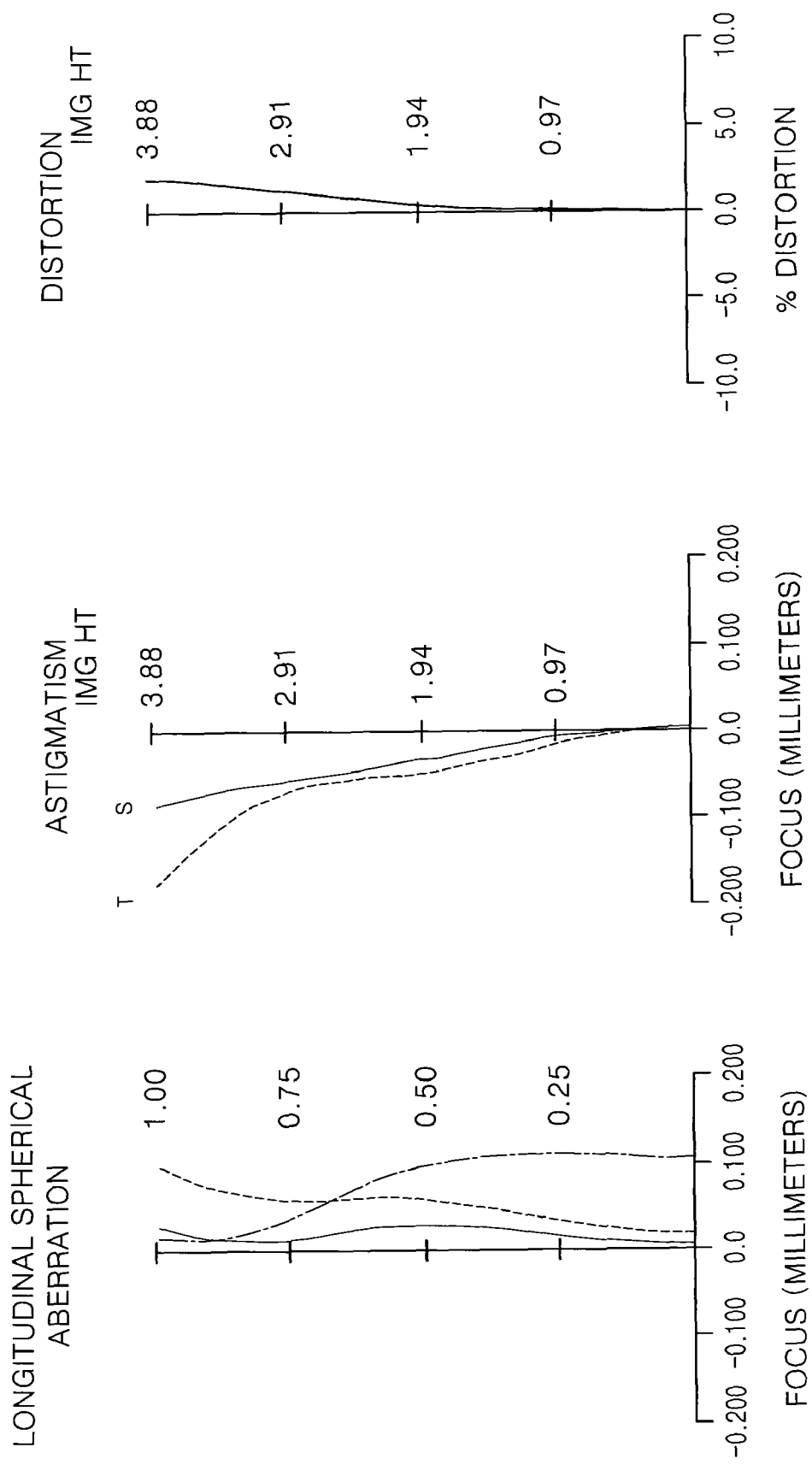

FIG. 5 is a schematic view illustrating a zoom lens according to another embodiment of the invention, and its data is as follows.

| | | |
|---|---|---|
| Fno | | 2.88~4.63~5.95 |
| f | | 4.43~9.66~20.86 |
| ω | | 45.43~21.68~10.34 |
| D4 | | 14.434~5.062~0.610 |
| D10 | | 4.024~10.551~23.158 |
| D12 | | 2.263~1.888~1.500 |

| LENS SURFACE | R | D | Nd | νd |
|---|---|---|---|---|
| S1* | 153.572 | 1.120 | 1.80470 | 40.90 |
| S2* | 5.539 | 2.460 | | |
| S3 | 9.191 | 1.670 | 1.94595 | 17.98 |
| S4 | 14.703 | D4 | | |
| S5* | 6.665 | 1.570 | 1.58913 | 61.25 |
| S6* | −19.511 | 0.328 | | |
| S7 | 7.251 | 1.780 | 1.88300 | 40.81 |
| S8 | −5.718 | 0.400 | 1.69895 | 30.05 |
| S9 | 3.434 | 0.954 | | |
| S10 | INF | D10 | | |
| S11 | 26.868 | 2.100 | 1.58913 | 61.25 |
| S12* | −9.452 | D12 | | |
| S13 | INF | 0.800 | 1.15168 | 64.20 |
| S14 | INF | 0.700 | | |

| LENS SURFACE | ε | A4 | A6 | A8 | A10 |
|---|---|---|---|---|---|
| S1 | 1.0000 | −0.147162E−03 | 0.676985E−05 | −0.997897E−07 | 0.535608E−09 |
| S2 | 0.6604 | −0.298722E−03 | −0.311680E−06 | 0.339641E−06 | −0.987233E−08 |
| S5 | −1.2348 | −0.108143E−03 | −0.852753E−05 | −0.294121E−05 | 0.433405E−06 |
| S6 | 1.0000 | 0.231289E−03 | 0.156735E−04 | −0.172155E−05 | 0.501282E−06 |
| S12 | 1.0000 | 0.605038E−03 | 0.118519E−04 | −0.921661E−06 | 0.163469E−07 |

*aspherical surface

Another Embodiment

Figure 7:
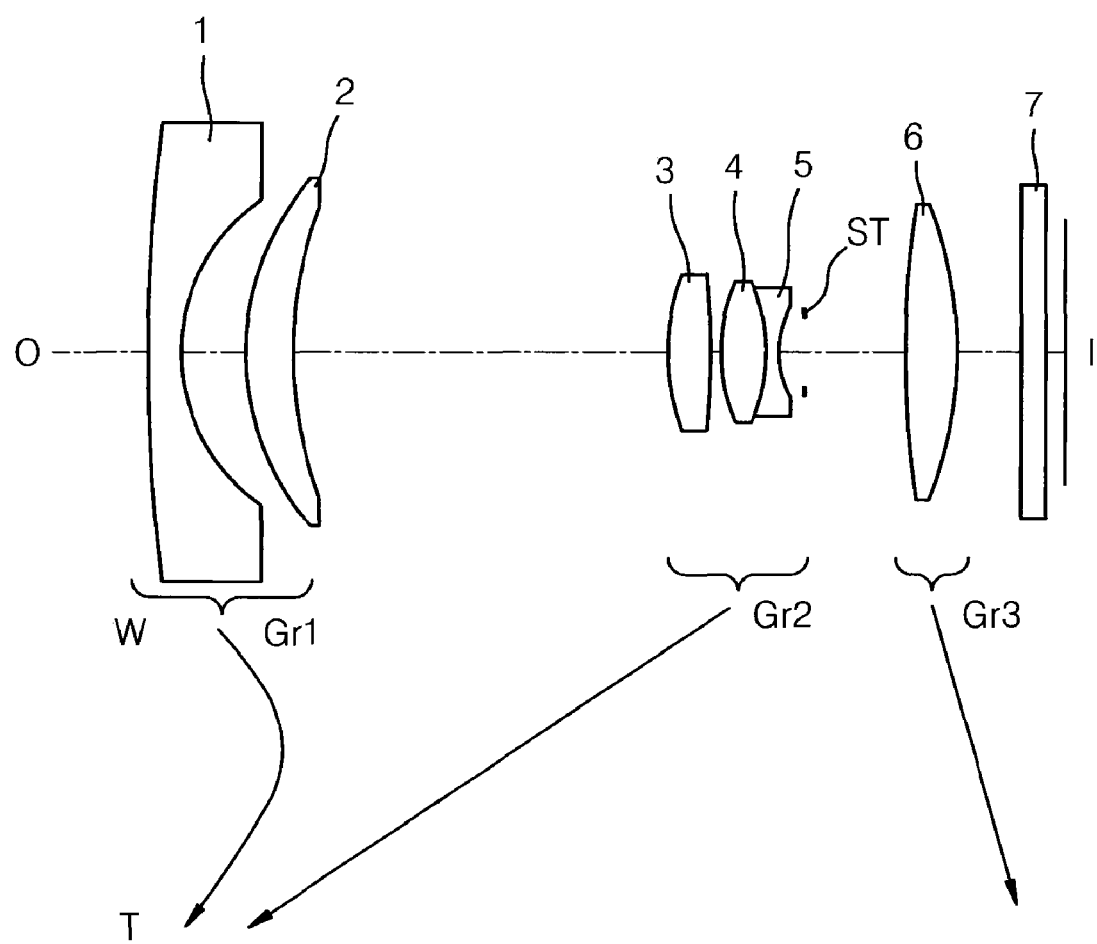
FIG. 7 is a schematic view illustrating a zoom lens at the wide position, the middle position, and the tele-position, according to another embodiment of the invention.
Figure 8A:
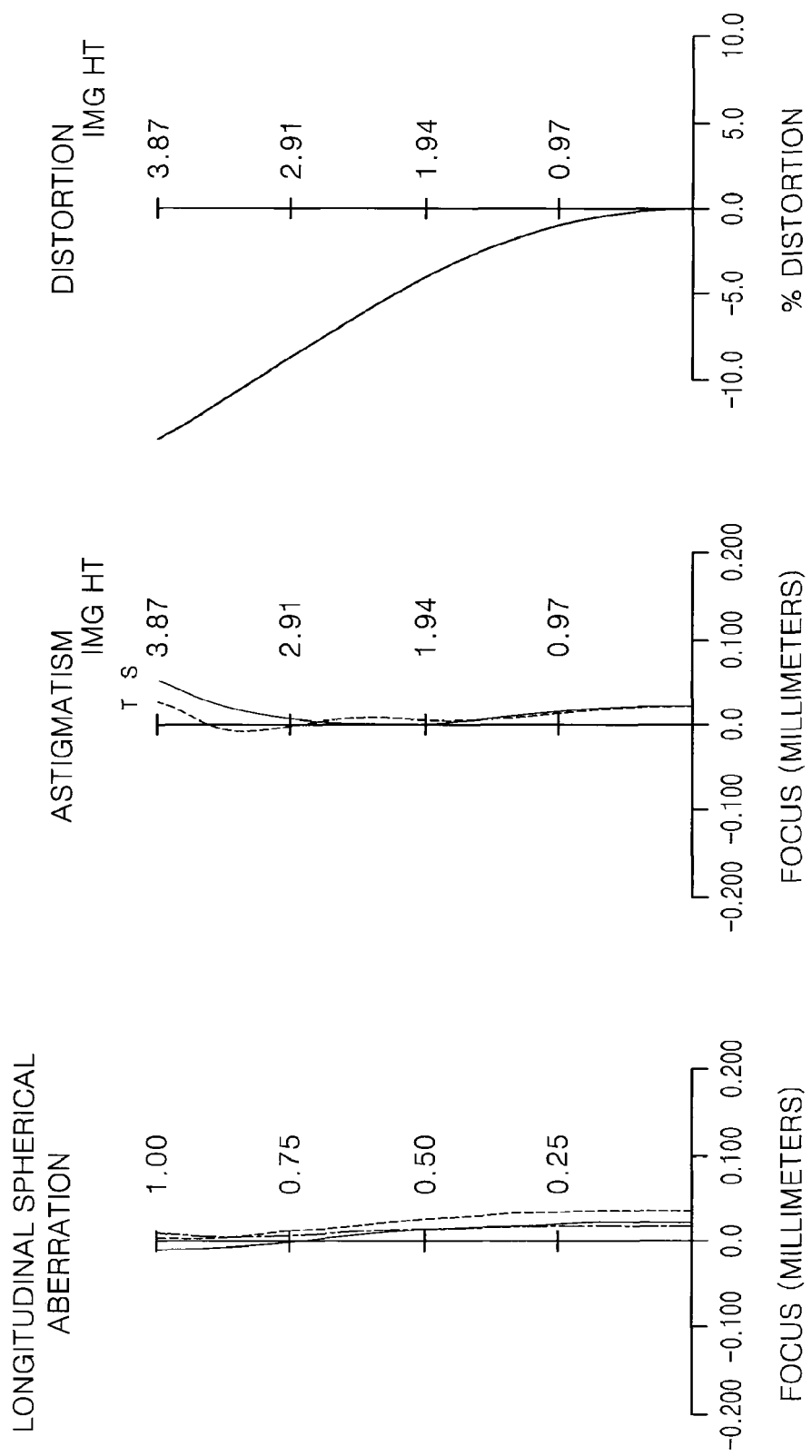
FIGS. 8A, 8B and 8C are graphs illustrating aberrations of the zoom lens of FIG. 7 at the wide position, the middle position, and the tele-position.
Figure 8B:
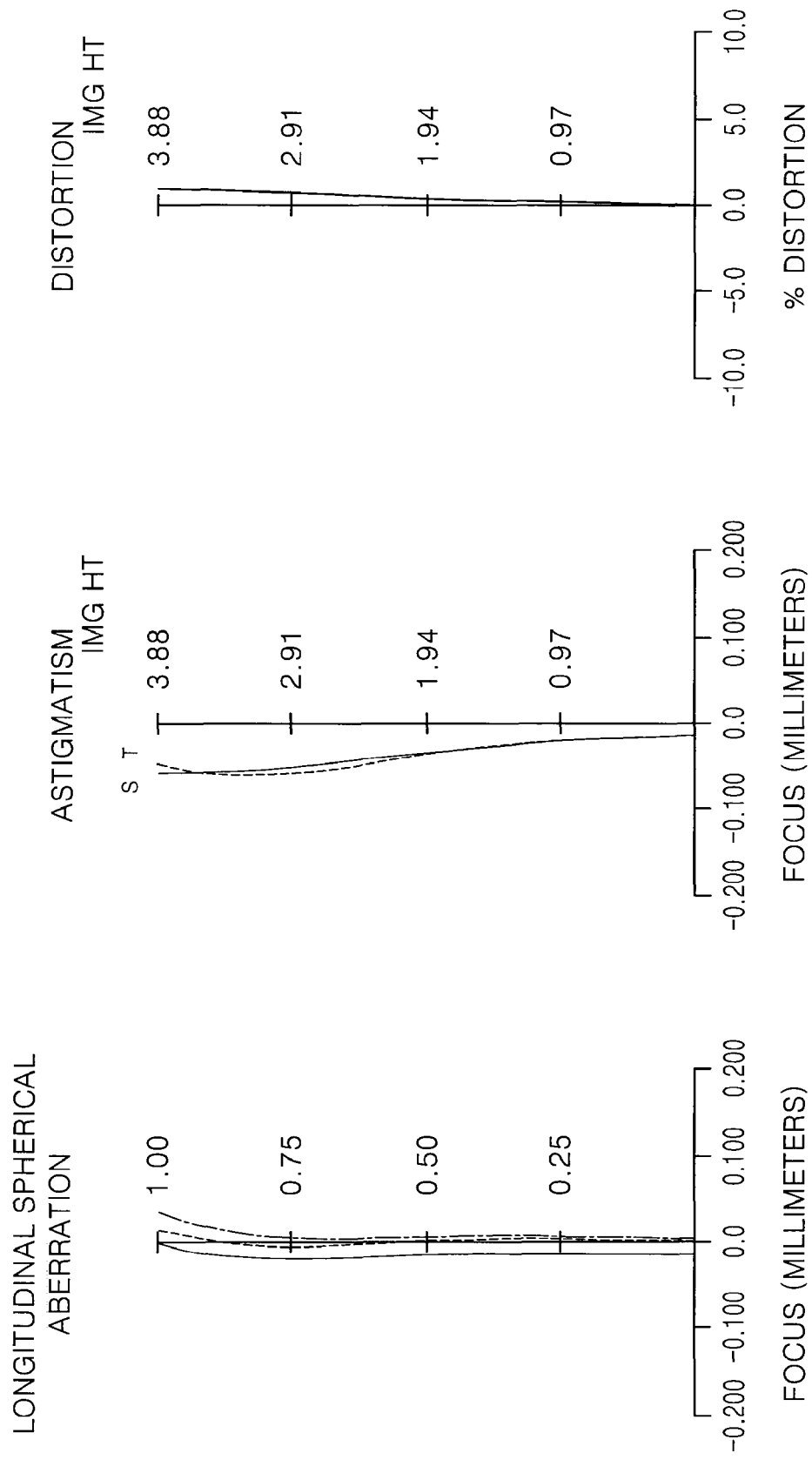
Figure 8C:
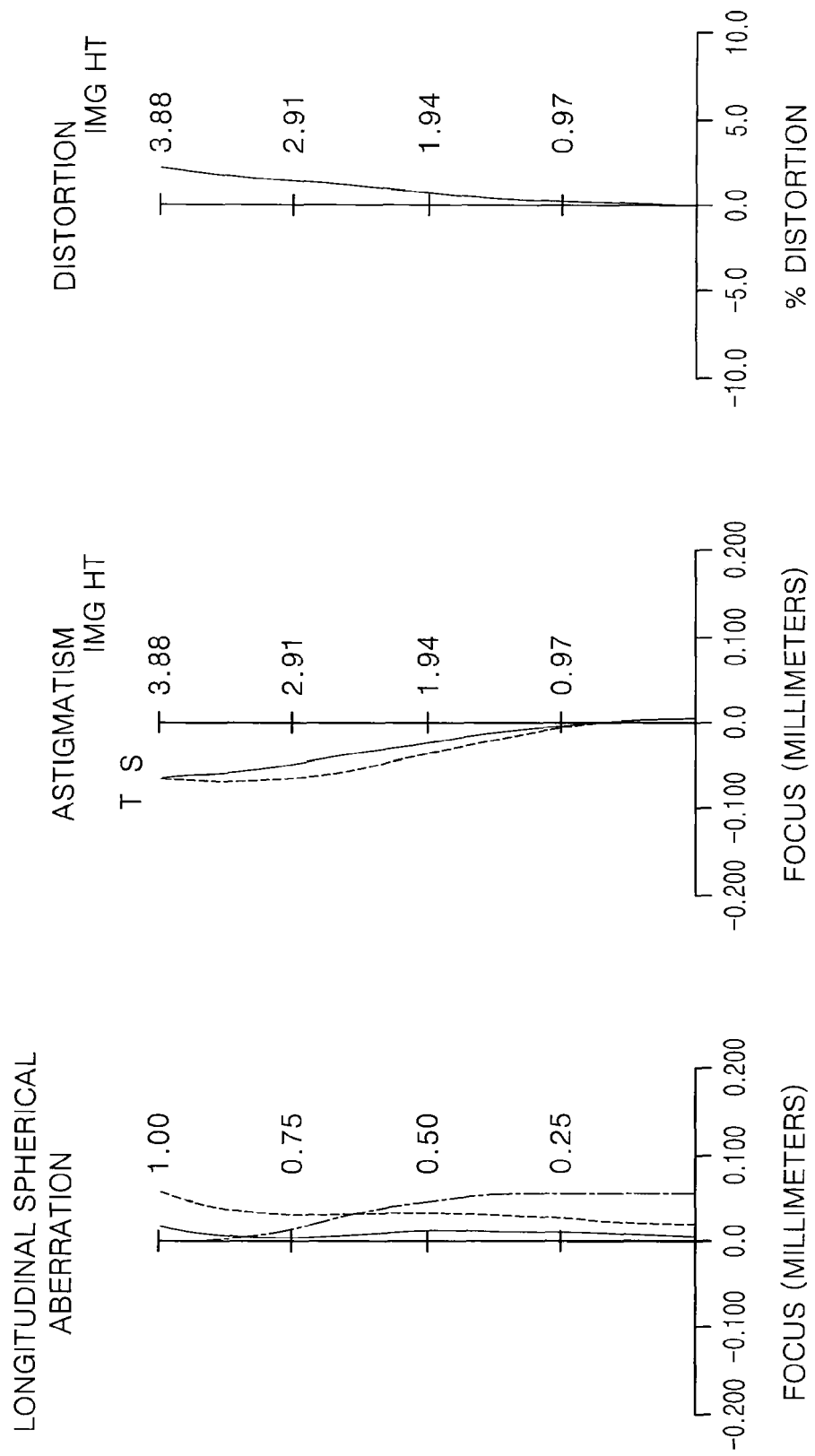

FIG. 7 is a schematic view illustrating a zoom lens according to another embodiment of the invention, and its data is as follows.

| | | |
|---|---|---|
| Fno | | 2.73~4.01~5.98 |
| f | | 4.43~9.31~16.79 |
| ω | | 45.35~22.41~12.74 |
| D4 | | 12.982~4.166~0.591 |
| D10 | | 3.396~8.843~6.596 |
| D12 | | 2.232~1.955~1.463 |

| LENS SURFACE | R | D | Nd | νd |
|---|---|---|---|---|
| S1* | 97.137 | 1.100 | 1.85066 | 40.43 |
| S2* | 5.737 | 2.260 | | |
| S3 | 8.893 | 1.650 | 1.94595 | 17.98 |
| S4 | 14.345 | D4 | | |
| S5* | 6.756 | 1.510 | 1.55333 | 71.68 |
| S6* | −22.695 | 0.360 | | |
| S7 | 6.177 | 1.545 | 1.88300 | 40.81 |
| S8 | −6.177 | 0.420 | 1.69895 | 30.05 |
| S9 | 3.138 | 1.018 | | |

-continued

| | | | | | |
|---|---|---|---|---|---|
| S10 | | INF | D10 | | |
| S11* | | 34.240 | 1.760 | 1.60602 | 57.40 |
| S12* | | −10.968 | D12 | | |
| S13 | | INF | 0.800 | 1.15168 | 64.20 |
| S14 | | INF | 0.700 | | |

| LENS SURFACE | $\epsilon$ | A4 | A6 | A8 | A10 |
|---|---|---|---|---|---|
| S1 | 1.0000 | −0.753639E−04 | 0.509575E−05 | −0.834213E−07 | 0.494548E−09 |
| S2 | 0.7085 | −0.202333E−03 | 0.275967E−05 | 0.186104E−06 | −0.674845E−08 |
| S5 | −1.8636 | −0.913406E−04 | 0.344638E−04 | −0.975915E−05 | 0.832338E−06 |
| S6 | 1.0000 | −0.412160E−04 | 0.639198E−04 | −0.625888E−05 | 0.660820E−06 |
| S12 | 1.0000 | −0.699406E−05 | −0.225219E−07 | −0.558828E−07 | 0.193634E−08 |
| S13 | 1.0000 | 0.602853E−03 | −0.145978E−04 | 0.378274E−06 | −0.455064E−08 |

*aspherical surface

Table 1 below shows that the embodiments of FIGS. 1, 3, 5 and 7 satisfy the conditions of Inequalities 1 through 8, respectively.

TABLE 1

| | Embodiment of FIG. 1 | Embodiment of FIG. 3 | Embodiment of FIG. 5 | Embodiment of FIG. 7 |
|---|---|---|---|---|
| Inequality 1: $\|\beta 2T\|$ | −1.951 | −2.404 | −2.362 | −1.831 |
| Inequality 2: $\|\beta 2T/\beta 2W\|$ | 3.447 | 4.324 | 4.358 | 3.514 |
| Inequality 3: $\|CrG4R/fT\|$ | 0.325 | 0.246 | 0.274 | 0.368 |
| Inequality 4: $\|fG45/fG3\|$ | 2.643 | 3.111 | 4.402 | 5.675 |
| Inequality 5: vdG3 − vdG2 | 43.27 | 63.58 | 43.27 | 53.7 |
| Inequality 6: TLT − TLW | 1.999 | 5.650 | 4.548 | 0.036 |
| Inequality 7: $(1 − \beta 2T) \times \beta 3T$ | 2.376 | 2.730 | 2.609 | 2.228 |
| Inequality 8: DisW | −10.86 | −10.84 | −13.69 | −13.65 |

The zoom lenses according to the embodiments of the invention may be miniaturized, have a high zoom magnification and secure a wide angle of view at the wide position. An object can be imaged in a wide range by securing the wide angle of view. The zoom lenses can be applied to image optical devices including digital still cameras, video cameras, and mobile terminals having solid-state imaging devices such as CCD and CMOS.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:
1. A zoom lens comprising:
in order from an object side,
a first lens group having negative refractive power;
a second lens group having positive refractive power; and
a third lens group having positive refractive power,
and a light adjusting unit disposed between the second lens group and the third lens group,
wherein the first lens group comprises:
a negative lens having an aspherical surface at least on the image side; and
a positive lens having large curvature on the object side,
wherein the second lens group comprises:
a front group comprising a positive lens having an aspherical surface on the object side, the front group having positive refractive power as a whole; and
a rear group comprising a doublet lens comprising a positive lens and a negative lens, the rear group having an overall negative refractive power, the rear group being spaced apart from the front group by a predetermined air gap, and wherein the zoom lens satisfies Inequalities, $$1.6 < |\beta 2T| < 2.7$$

$$3.0 < |\beta 2T/\beta 2W| < 4.6$$

$$0.2 < |CrG4R/fT| < 0.45$$

$$2.0 < |fG45/fG3| < 7.0$$

$$35 < vdG3 - vdG2 < 75 \qquad \text{[Inequalities]}$$

where $\beta 2T$ denotes magnification of the second lens group at a tele-position, and $\beta 2W$ denotes magnification of the second lens group at a wide position, and fT denotes the focal length of the zoom lens at the tele-position, and CrG4R denotes the radius of curvature of the contact surface of the doublet lens, and fG45 denotes the focal length of the rear group, and fG3 denotes the focal length of the front group, and vdG3 denotes an Abbe number of the positive lens of the front group with respect to a d-line, and vdG2 denotes an Abbe number of the positive lens of the first lens group with respect to the d-line.

2. The zoom lens of claim 1, wherein the second lens group moves in a perpendicular direction to the optical axis to compensate for lens-shake, and the zoom lens satisfies the following Inequality, $$2.0 < (1 - \beta 2T) \times \beta 3T < 3.0$$

where $\beta 3T$ denotes magnification of the third lens group at the tele-position.

3. The zoom lens of claim 1, wherein the aspherical surface of the negative lens of the first lens group has curvature that decreases toward the edge of the aspherical surface of the negative lens and is less than paraxial curvature of the aspherical surface.

4. The zoom lens of claim 1, wherein the first, second and third lens groups move when zooming.

5. The zoom lens of claim 4, wherein the light adjusting unit moves together with the second lens group when zooming.

6. A zoom lens comprising:
in order from an object side,
a first lens group having negative refractive power;
a second lens group having positive refractive power; and
a third lens group having positive refractive power,
and a light adjusting unit disposed between the second lens group and the third lens group,
wherein the first lens group comprises:
a negative lens having an aspherical surface at least on the image side; and
a positive lens having large curvature on the object side,
wherein the second lens group comprises:
in order from the object side,
a positive lens having an aspherical surface on the object side; and
a doublet lens comprising a positive lens and a negative lens, and
wherein the zoom lens satisfies the following Inequalities, $2.0 < |fG45/fG3| < 7.0$ $35 < vdG3 - vdG2 < 75$ $1.8 < |\beta 2T| < 2.7$ $0.0 < TLT - TLW < 7.0$ where fG45 denotes the focal length of the doublet lens, and fG3 denotes the focal length of the positive lens on the object side of the second lens group, and vdG3 denotes an Abbe number of the positive lens on the object side of the second lens group with respect to a d-line, and vdG2 denotes an Abbe number of the positive lens of the first lens group with respect to the d-line, and β 2T denotes magnification of the second lens group at a tele-position, and TLT denotes the total length of the zoom lens at the tele-position, and TLW denotes the total length of the zoom lens at a wide position.

7. The zoom lens of claim 6, wherein the second lens group moves in a perpendicular direction to the optical axis to compensate for lens-shake, and the zoom lens satisfies the following Inequality, $2.0 < (1 - \beta 2T) \times \beta 3T < 3.0$ where β 3T denotes magnification of the third lens group at the tele-position.

8. The zoom lens of claim 6, wherein the aspherical surface of the negative lens of the first lens group has curvature that decreases toward the edge of the aspherical surface of the negative lens and is less than paraxial curvature of the aspherical surface.

9. The zoom lens of claim 6, wherein the first, second and third lens groups move when zooming.

10. The zoom lens of claim 9, wherein the light adjusting unit moves together with the second lens group when zooming.

11. An imaging optical device comprising:
a zoom lens; and
an imaging sensor that receives light collected by the zoom lens,
wherein the zoom lens comprises:
in order from an object side,
a first lens group having negative refractive power;
a second lens group having positive refractive power; and
a third lens group having positive refractive power,
and a light adjusting unit disposed between the second lens group and the third lens group,
wherein the first lens group comprises:
a negative lens having an aspherical surface at least on an image side; and
a positive lens having large curvature on the object side,
wherein the second lens group comprises:
a front group comprising a positive lens having an aspherical surface at the object side, the front group having an overall positive refractive power; and
a rear group comprising a doublet lens comprising a positive lens and a negative lens, the rear group having an overall negative refractive power, the rear group being spaced apart from the front group by a predetermined air gap, and
wherein the zoom lens satisfies the following Inequalities, $1.6 < |\beta 2T| < 2.7$ $3.0 < |\beta 2T/\beta 2W| < 4.6$ $0.2 < |CrG4R/fT| < 0.45$ $2.0 < |fG45/fG3| < 7.0$ $35 < vdG3 - vdG2 < 75$ where β 2T denotes magnification of the second lens group at a tele-position, and β 2W denotes magnification of the second lens group at a wide position, and fT denotes the focal length of the zoom lens at the tele-position, and CrG4R denotes the radius of curvature of the contact surface in the doublet lens, and fG45 denotes the focal length of the rear group, and fG3 denotes the focal length of the front group, and vdG3 denotes an Abbe number of the positive lens of the front group with respect to a d-line, and vdG2 denotes an Abbe number of the positive lens of the first lens group with respect to the d-line.

12. The imaging optical device of claim 11, further comprising a distortion correcting member that calculates a distortion correction amount for distortion generated at the zoom lens, so as to correct the distortion.

13. The imaging optical device of claim 12, wherein the distortion has a range of Inequality, $-15 < DisW < -6$ where DisW denotes distortion at a maximum image height at the wide position.

14. An imaging optical device comprising:
a zoom lens; and
an imaging sensor that receives light collected by the zoom lens,
wherein the zoom lens comprises:
in order from an object side,
a first lens group having negative refractive power;
a second lens group having positive refractive power; and
a third lens group having positive refractive power, and
and light adjusting unit disposed between the second lens group and the third lens group,
wherein the first lens group comprises:
a negative lens having an aspherical surface at least on the image side; and
a positive lens having large curvature on the object side, wherein the second lens group comprises:
in order from the object side,
a positive lens having an aspherical surface on the object side; and
a doublet lens comprising a positive lens and a negative lens, and
wherein the zoom lens satisfies the following Inequalities, $$2.0<|fG45/fG3|<7.0$$

$$35<vdG3-vdG2<75$$

$$1.8<|\beta 2T|<2.7$$

$$0.0<TLT-TLW<7.0$$

where fG45 denotes the focal length of the doublet lens, and fG3 denotes the focal length of the positive lens on the object side of the second lens group, and vdG3 denotes an Abbe number of the positive lens on the object side of the second lens group with respect to a d-line, and vdG2 denotes an Abbe number of the positive lens of the first lens group with respect to the d-line, and β 2T denotes magnification of the second lens group at a tele-position, and TLT denotes a total length of the zoom lens at the tele-position, and TLW denotes a total length of the zoom lens at a wide position.

15. The imaging optical device of claim 14, further comprising a distortion correcting member that calculates a distortion correction amount for distortion generated at the zoom lens, so as to correct the distortion.

16. The imaging optical device of claim 15, wherein the distortion has a range of Inequality, $$-15<DisW<-6$$

where DisW denotes distortion at a maximum image height at the wide position.

* * * * *